Feb. 27, 1968  MAKOTO TAKEUCHI ET AL  3,371,271
MEASUREMENT OF UNPAIRED ELECTRON DENSITY
Filed Feb. 4, 1965  2 Sheets-Sheet 1
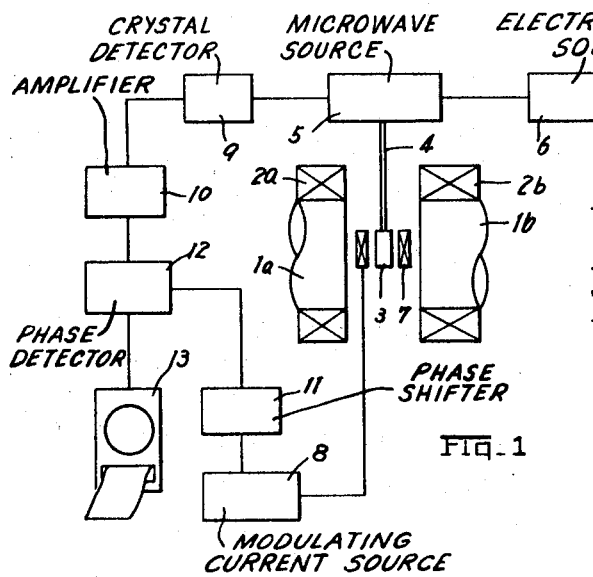
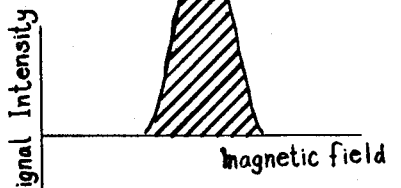
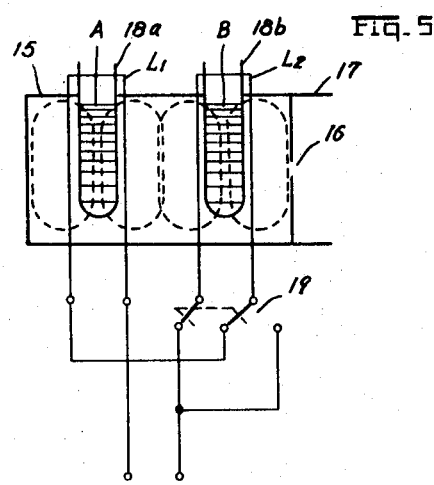
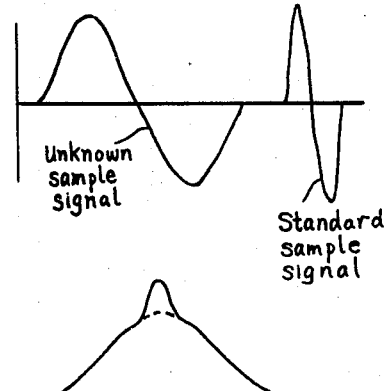
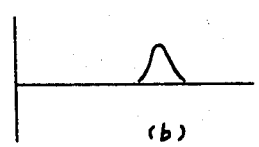
INVENTORS
Makoto Takeuchi +
BY Seishiro Yoshioka
Webb, Burden, Robinson & Webb
Attorneys Feb. 27, 1968   MAKOTO TAKEUCHI ET AL   3,371,271
MEASUREMENT OF UNPAIRED ELECTRON DENSITY
Filed Feb. 4, 1965   2 Sheets-Sheet 2

Fig. 1B   $\phi = 0°$

Fig. 1C   $\phi = 180°$

INVENTORS
Makoto Takeuchi +
Seishiro Yoshioka
BY
Webb, Burden, Robinson & Webb
Attorneys United States Patent Office 3,371,271
Patented Feb. 27, 1968

3,371,271
MEASUREMENT OF UNPAIRED
ELECTRON DENSITY
Makoto Takeuchi and Seishiro Yoshioka, Tokyo, Japan, assignors to Nihon Denshi Kabushiki Kaisha, Tokyo, Japan, a corporation of Japan
Filed Feb. 4, 1965, Ser. No. 430,376
Claims priority, application Japan, Feb. 8, 1964, 39/6,459
5 Claims. (Cl. 324—.5)

ABSTRACT OF THE DISCLOSURE

An apparatus and method for determining unpaired electron density of a first sample by positioning a standard sample and the first sample in a cavity resonator simultaneously and modulating a polarizing magnetic field applied to the cavity with a frequency and intensity that are the same at both samples in order that the resonance absorption curves may be integrated where the modulation is in-phase and out-of-phase by 180°.

This invention relates to improvements in the measurement of electron spin resonance and relates in particular to a method and apparatus for quantitatively analyzing the density of unpaired electrons in a paramagnetic material, such as free radicals, salts of transient metals and organic chelates thereof, and semi-conductor and lattice defect materials.

FIGURE 1 is a conventionally used electron spin resonance apparatus;

FIGURES 1B and 1C are illustrative resonance absorption signals that are 180° out-of-phase with one another;

FIGURES 2–4, inclusive, show resonance absorption signals obtained by the use of the apparatus of FIGURE 1;

FIGURE 5 shows an illustrative elevation view of a resonator cavity that embodies the apparatus of the present invention; and FIGURES 6(a)–(d) show the resonance absorption signals obtained by employing the method and apparatus of the present invention.

The present invention is an improvement of conventional electron spin resonance determining apparatus such as is illustrated by the schematic diagram of FIGURE 1 and further illustrated by FIGURES 1A–1E. A preliminary description of the apparatus of FIGURES 1, 1A, 1B, 1C, 1D and 1E is necessary for a full understanding of the present invention.

Figure 1A:
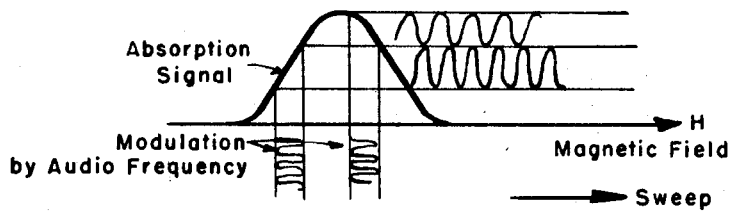
FIGURE 1A is an illustrative showing of "lock in" or phase sensitive amplification.

In FIGURE 1, 1a and 1b are the magnetic pole pieces of a magnet and 2a and 2b are the respective exciting coils. A cavity resonator 3 into which the material to be tested is inserted is positioned between these pole pieces so as to be subjected to a steady static magnetic field.

The cavity resonator 3 containing the sample material is connected to a microwave source 5 through a wave guide 4. Microwave source 5 includes a klystron oscillator, a cavity wave meter, a unidirectional attenuator, a magic T junction and an impedance transducer. The klystron oscillator in the microwave source is provided with an electric current from a source 6 so as to generate microwave oscillations.

Further, a modulating coil 7 positioned between the poles is disposed to provide a modulating magnetic field to the specimen within the cavity. Coil 7 is positioned outside cavity 3 but may just as readily be positioned within this cavity.

Coil 7 is supplied with a modulating current of, for instance 100 kc., from a modulating current source 8.

The apparatus shown by FIGURE 1 and described above is well known. The operation of such device is taught in many patents and publications including United States Patent No. 3,090,003, R. C. Rempel et al., and the publication Free Radicals as Studied by Electron Spin Resonance (D. J. E. Ingram, London: Butterworth's Scientific Publications, particularly page 39).

Cavity 3 is provided with a modulating magnetic field by coil 7 to thereby induce paramagnetic resonance. To be more explicit, the modulation in this case is to detect a weak absorption signal. To detect such a weak signal, a narrow band amplifier and balanced mixer are used after the radio frequency and detector. This combination is usually referred to as a "lock in" or phase sensitive amplifier.

Such an amplification is illustrated by FIGURE 1A.

Where one is amplifying a weak signal, the sample cavity is generally modulated by audio frequency while the steady static magnetic field is swept. As a result of this procedure, the value which corresponds to every instant absorption signal is obtained as an audio frequency element. The resulting absorption curve is amplified by a narrow-band amplifier and then detected by a phase sensitive detector. The signal so obtained is represented by the curve of FIGURE 1B. If the sample cavity is modulated by a modulating current which is out of phase 180° with regards to the aforementioned current, the derived signal is as shown by FIGURE 1C.

Figure 1D:
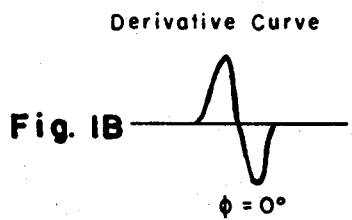
FIGURES 1D and 1E are enlarged illustrative views of the microwave source 5 of FIGURE 1 and a magic T microwave guide junction, respectively.
Figure 1D:
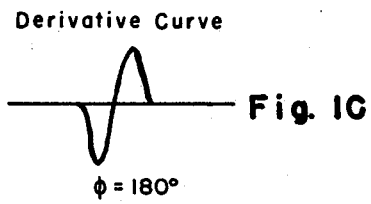
Figure 1D:
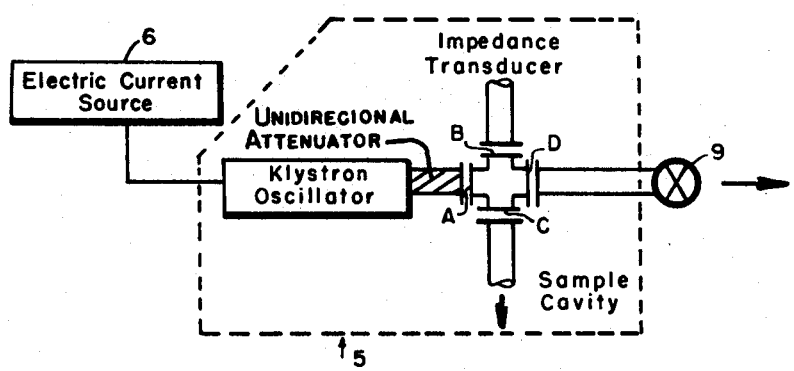
Figure 1E:
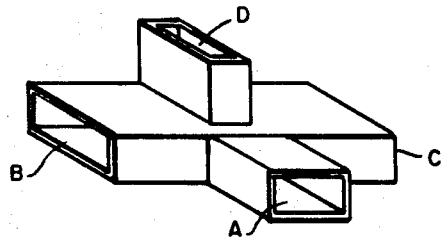

In FIGURE 1D there is shown an illustrative enlarged view of the microwave source 5, and FIGURE 1E shows an enlarged view of a magic T junction.

Microwaves from the klystron oscillator enter the opening A of the magic T junction and are conveyed through B and C but not through D. On the other hand, microwaves entering opening D are conveyed through B or C but never through A.

Accordingly, if A is connected to the oscillator, B to an impedance transducer, C to a sample cavity, and D to a crystal detector and if the impedance transducer is properly adjusted microwave power from the oscillator enters into both the cavity resonator and the impedance transducer and the microwave reflections from each are detected by the crystal detector 9 so that the magic T junction serves the function of a bridge circuit.

With this arrangement, the resonance absorption signal of the sample is detected by a crystal detector 9 and is amplified by an amplifier 10. The amplified signal is detected by means of a phase shifter 11. The output signal from the modulating current source is provided to phase detector 12 through a phase shifter 11. The output signal of phase detector 12 is indicated and recorded by a recorder 13.

It will be understood that generally in an electron spin resonance analysis the intensity of the resonance absorption curve is substantially proportional to the number of unpaired electrons which affect electron spin resonance while the integrated intensity of the resonance absorption signal corresponds to an area enclosed by a resonance absorption curve and the abscissa as shown in FIGURE 2 by the area encompassed by the oblique lines.

When it is desired to determine the density of unpaired electrons in an unknown sample, it is necessary to acquire information relating to the unknown sample and additionally information relating to a known sample for comparison purposes in making the determination. To accomplish this, a prevalent practice is to first determine the information of the unknown sample and then make the determination on a known or standard sample as substituted for the unknown specimen. However, by employing this method, the determination of the standard sample must be made under the identical conditions as the determinations for the unknown sample. It is extremely difficult to keep the same conditions for these measurements since the dielectric constant or dielectric loss differs in accordance with the sample to be measured and additionally the resonating frequency or Q value of a sample cavity readily fluctuates. Even if the identical conditions are theoretically created, it is still necessary to solve variation difficulties such as are caused by undesirable fluctuations of reference signals from the microwave source and/or variations in the room temperatures surrounding the cavity. For accurate determinations, it is necessary to eliminate all such undesirable variations between these measurements. Accordingly, there invariably exists large measurement errors in the respective information of the standard sample and the unknown sample.

To eliminate these difficulties in the conventional apparatus and method, the standard sample and the unknown sample are both positioned in the cavity at the same time, and the resonance absorption curves of each are determined under the same conditions and at the same time so as to eliminate the above described difficulties. This practice successfully increases accuracy in the measurement since the undesirable effects or variation are applicable to both samples and thus compensate for each other.

However, the conventional method and apparatus is defective, since when the resonance signal of the standard sample or the resonance signal of the unknown sample lies upon one another, comparison of the respective signals is impossible. Consequently, as shown by FIGURE 4, the standard sample must be of a material that resonates at a different intensity of magnetic fields than the unknown sample. Actually, it is very inconvenient to find an appropriate standard sample which meets these requirements.

The present invention overcomes the above-mentioned difficulties and provides a novel method and apparatus which is readily adaptable for use in the conventionally used apparatus and method.

In the present invention sample tubes which contain a standard sample and an unknown sample and which are identical to one another in construction are inserted within the cavity of a cavity resonator that is provided with two magnetic fields of the same wave length and intensity. The respective tubes are positioned longitudinally and are provided with separate modulating coils at either side of the cavity. The respective coils ordinarily provide a modulating magnetic field of microwaves that have the same frequency and intensity and additionally are in the same phase. However, one of the coils is capable of providing a magnetic field that has the same intensity and frequency as the other but which is out of phase 180° from the other coil. Such reversal of phase is effected by switching means.

By means of this construction, it is possible to obtain the ratio of unpaired electron density of the unknown sample to that of the known sample by employing such switching means.

In the present invention, the multicavity resonator shown by the illustrative cross-sectional view of FIGURE 5 is substituted for the cavity resonator 3 of FIGURE 1. This resonator is of rectangular construction and may be a TE104 mode rectangular cavity resonator. Cavity resonator 15 is connected to a wave guide 17 by a coupling iris 16. The areas enclosed by dotted lines represent magnetic fields of microwave distribution within the cavity resonator. Tubes 18a and 18b are filled with a standard sample and an unknown sample, respectively, and are positioned within microwave magnetic fields which have the same intensity and distribution. At both sides of said tubes are modulating coils $L_1$ and $L_2$ which are constructed in the same manner and are each arranged longitudinally and are connected to a modulating source. Electric currents in phase or out of phase 180° in respect to the two modulating coils $L_1$ and $L_2$ are controlled by the change over switch 19.

FIGURE 6(a) shows a resonance absorption curve of a standard sample. FIGURE 6(b) shows a resonance absorption curve of an unknown sample. When the coils $L_1$ and $L_2$ are modulated by the same phase modulating current, the sum of the respective derivative signals of the standard sample and the unknown sample are obtained by the recorder 13 of FIGURE 1. Accordingly, the resonance absorption curve shown in FIGURE 6(c) can be obtained by integrating the resultant signal recorded by the recorder 13.

Subsequently, when the switch 19 is moved so as to give the modulating magnetic fields through coil $L_1$ out of phase 180° with regard to the coil $L_2$, the resonance absorption curve of the unknown sample is distributed conversely symmetrical with respect to the abscissa to that of FIGURE 6(b), and, accordingly, the resulting resonance absorption curve by summing each signal of the standard sample and the unknown sample is illustrated by FIGURE 6(d).

If $I_1$ is the integrated intensity of the resonance absorption curve obtained where the same phase modulation is employed in each coil $L_1$ and $L_2$ and $I_2$ is the integrated intensity of the resonance absorption curve where the phase modulation in these two coils differ (180°), $I_1+I_2$ is proportional to double the unpaired electron density of the standard sample, and $|I_1-I_2|$ is proportional to double the unpaired electron density of the unknown sample.

Accordingly, $I_1+I_2/|I_1-I_2|$ corresponds to the ratio between the unpaired electron density of the standard sample and that of the unknown sample.

Described in greater detail, if $Sa$ is presumed to be the integrated area of the standard sample of FIGURE 6(a) and $Sb$ is presumed to be the integrated area of the unknown sample of FIGURE 6(b), $I_1$ and $I_2$ are determined by:

$$I_1=|Sb|+|Sa|$$
$$I_2=|Sb|-|Sa|$$

and $$\frac{|I_1-I_2|}{I_1+I_2}=\frac{2Sa}{2Sb}=\frac{Sa}{Sb}$$

Accordingly, if $N_s$ is presumed to be the unpaired electron density of the standard sample, and N is the unpaired electron density of the unknown sample, N may be given as follows:

$$N=N_s\frac{Sb}{Sa}=N_s\frac{I_1+I_2}{|I_1-I_2|}$$

While we have described the presently preferred embodiments of our invention, it is to be understood that it may be otherwise embodied within the scope of the following claims.

We claim:

1. In a method for quantitatively determining unpaired electron density in a first sample of paramagnetic material by subjecting said first sample and a sample of known unpaired electron density to a steady magnetic field having a sweep intensity and to a modulating magnetic field to cause said samples to resonate, subjecting said resonating samples to a microwave energy and detecting resonance absorption signals from the microwave reflections, the improvement in combination therewith comprising:

(A) resonating each of said samples with separate, parallel, in-phase modulating magnetic fields having the same frequency and intensity;

(B) after detecting the resonance absorption signal from said samples, changing one of said modulating magnetic fields 180° out of phase with respect to said other field;

(C) detecting a signal from said samples modulated by said out-of-phase fields; and (D) determining the unpaired electron density of said first sample by comparing said signals and by applying integrated detected signal values to $$N = N_s \frac{I_1 + I_2}{|I_2 - I_2|}$$

where
- N = unpaired electron density of the first sample,
- $N_s$ = the integrated intensity of known sample,
- $I_1$ = the integrated intensity of in-phase resonance absorption signals, and
- $I_2$ = integrated intensity of out-of-phase resonance absorption signals.

2. In an apparatus for quantitatively determining unpaired electron density comprising a microwave source, a cavity resonator connected to said source and positioned in a steady magnetic field having a sweep intensity, means for providing a modulating magnetic field to cause resonance in samples positioned within said cavity and detection means for detecting resonance absorption signals from microwave reflections, the improvement comprising in combination therewith:

(A) means for positioning a first and second sample in said cavity resonator, said second sample having a known unpaired electron density;

(B) said means for providing a modulating magnetic field including first and second coils positioned about each of said samples and having the same frequency and intensity so as to cause said samples to resonate;

(C) means for changing the phase of one of said coils 180° out of phase with respect to the other of said coils;

(D) means for detecting resonance absorption signals from both samples, whereby the integrated intensity of the in-phase resonance absorption signal can be compared with the out-of-phase resonance absorption signal to obtain the unpaired electron density of said first sample by $$N = N_s \frac{I_1 + I_2}{|I_1 - I_2|}$$

where
- N = unpaired electron density of the first sample,
- $N_s$ = integrated intensity of the second sample,
- $I_1$ = integrated intensity of the in-phase resonance absorption signals, and
- $I_2$ = integrated intensity of the out-of-phase resonance absorption signals.

3. The improvement set forth in claim 2, wherein said detection means includes means for integrating said resonance absorption signals.

4. An apparatus for determining the unpaired electron density of a first sample comprising:

(A) means for producing a magnetic field having a sweep intensity;

(B) means for positioning said first sample, and a second sample of known electron density in said magnetic field;

(C) means for producing a modulating current;

(D) first and second coils positioned about said first and second samples respectively and connected to said modulating current means to provide separate modulating magnetic fields of the same frequency, intensity, and phase to each sample to cause resonance therein;

(E) means for changing the phase 180° of one of said coils with respect to the other;

(F) means for subjecting said samples to microwave energy; and (G) means for detecting the resonance absorption signals from the microwave reflections, whereby an in-phase resonance absorption spectrum can be obtained when said coils are in phase and an out-of-phase resonance absorption spectrum can be obtained when said coils are out of phase while said magnetic field is swept, and from said spectrum the unpaired electron density of the first sample is determined by $$N = N_s \frac{I_1 + I_2}{|I_1 - I_2|}$$

where
- N = unpaired electron density of the first sample,
- $N_s$ = integrated intensity of the second sample,
- $I_1$ = integrated intensity of the in-phase resonance absorption signals, and
- $I_2$ = integrated intensity of the out-of-phase resonance absorption signals.

5. The apparatus set forth in claim 4, wherein said detection means includes means for integrating said signals.

References Cited

UNITED STATES PATENTS 3,197,692  7/1965  Hyde _____ 324—0.5

RUDOLPH V. ROLINEC, *Primary Examiner.*

M. J. LYNCH, *Assistant Examiner.*